US010313166B2

(12) United States Patent
O'Hanlon

(10) Patent No.: US 10,313,166 B2
(45) Date of Patent: Jun. 4, 2019

(54) BACKWARD-COMPATIBLE SIGNAL VARIATIONS FOR DATA AUGMENTATION

(71) Applicant: The MITRE Corporation, McLean, VA (US)

(72) Inventor: Brady O'Hanlon, Tewksbury, MA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 15/934,879

(22) Filed: Mar. 23, 2018

(65) Prior Publication Data

US 2018/0219707 A1 Aug. 2, 2018

Related U.S. Application Data

(62) Division of application No. 15/279,072, filed on Sep. 28, 2016, now Pat. No. 9,929,887.

(51) Int. Cl.
| | | |
|---|---|---|
| *H04L 27/20* | (2006.01) | |
| *G01S 19/30* | (2010.01) | |
| *G01S 19/02* | (2010.01) | |

(52) U.S. Cl.
CPC .............. *H04L 27/20* (2013.01); *G01S 19/02* (2013.01)

(58) Field of Classification Search
CPC ....... H04L 27/227; H04L 27/06; H04L 27/14; G01S 19/24
See application file for complete search history.

(56) References Cited

U.S. PATENT DOCUMENTS

| | | | |
|---|---|---|---|
| 5,559,445 | A | 9/1996 | Eaddy et al. |
| 6,278,781 | B1 | 8/2001 | Rhoads |
| 6,741,633 | B1 | 5/2004 | Cangiani et al. |
| 7,164,383 | B2 | 1/2007 | Fagan et al. |
| 7,956,803 | B2 | 6/2011 | Thomson et al. |
| 8,031,105 | B2 | 10/2011 | Stayton |

(Continued)

FOREIGN PATENT DOCUMENTS

| | | |
|---|---|---|
| WO | WO-2002/007368 | 1/2002 |
| WO | WO-2008/037332 | 4/2008 |
| WO | WO-2015/004011 | 1/2015 |

OTHER PUBLICATIONS

Humphreys Todd E., "Detection Strategy for Cryptographic GNSS Anti-Spoofing," IEEE Transactions on Aerospace and Electronics Systems, vol. 49, Issue 2, pp. 1-16.
Wullems, Christian et al. 2004, "A Broadcast Authentication and Integrity Augmentation for Trusted Differential GPS in Marine Navigation," Queensland University of Technology, pp. 125-139.
Canzian, Luca et al., Dec. 2010, "Anti-Spoofing and Open GNSS Signal Authentication with Signal Authentication Sequences," 7 pages.
Saha, Dola et al., 2012, "Secret Agent Radio: Covert Communication Through Dirty Constellations," University of Colorado Boulder, 15 pages.

(Continued)

*Primary Examiner* — Aristocratis Fotakis
(74) *Attorney, Agent, or Firm* — Morrison & Foerster LLP

(57) ABSTRACT

A system and method for augmenting the data capacity of pre-existing communications channels is provided. In one example, a subcarrier waveform of the system can be dithered based on data generated by an additional source and then transmitted. The dithered subcarrier can be passed through a plurality of matched filters so as to ascertain which dither pattern was used, thus ultimately allowing for the demodulation of the additional data source. The system and methods provided herein can be implemented with minimal impact to legacy users of the system as implementation of the dithering scheme can have minimal impact to the performance of receivers that are not equipped to demodulate the dithered waveforms.

18 Claims, 7 Drawing Sheets

(56) References Cited

U.S. PATENT DOCUMENTS

| | | | |
|---|---|---|---|
| 8,184,743 B2 | 5/2012 | Scarpa et al. | |
| 8,712,051 B2 | 4/2014 | Psiaki | |
| 2003/0040326 A1 | 2/2003 | Levy et al. | |
| 2007/0116098 A1* | 5/2007 | Valio | G01S 19/24 375/147 |
| 2008/0069187 A1* | 3/2008 | Chen | G01S 19/30 375/148 |
| 2009/0279592 A1 | 11/2009 | Pratt et al. | |
| 2010/0104046 A1 | 4/2010 | Hodgart et al. | |
| 2010/0195746 A1* | 8/2010 | Chen | G01S 19/30 375/259 |
| 2011/0102259 A1 | 5/2011 | Ledvina et al. | |
| 2011/0261805 A1* | 10/2011 | Landry, Jr. | G01S 19/24 370/342 |
| 2014/0111378 A1 | 4/2014 | Kim et al. | |
| 2015/0097721 A1 | 4/2015 | Broussalian | |
| 2017/0003397 A1* | 1/2017 | Macleod | G01S 19/30 |

OTHER PUBLICATIONS

Wesson, Kyle et al., Feb. 2012, "Practical Cryptographic Civil GPS Signal Authentication," Navigation: The Journal of the Institute of Navigation, pp. 1-15.

Rouabah, K. et al., Feb. 2013, "Mathematical Model of Non-Coherent-DLL Discriminator Output and Multipath Envelope Error for BOC (a, (3) Modulated Signals", University of M'sila, Algeria; 15 pages.

Yeste-Ojeda, Omar A. et al. "ADS-B Authentication Compliant with Mode-S Extended Squitter Using PSK Modulation," 2015, IEEE, pp. 1773-1778.

Mon, A. Khine Myint et al., Sep.-Oct. 2016, "Study and Analysis on Binary Offset Carrier (BOC) Modulation in Satellite Navigation Systems," IOSR Journal of Electronics and Communication Engineering (IOSR-JECE); 9 pages.

O'Hanlon, B., U.S. Notice of Allowance dated Dec. 7, 2017, directed to U.S. Appl. No. 15/279,072; 11 pages.

* cited by examiner

BACKWARD-COMPATIBLE SIGNAL VARIATIONS FOR DATA AUGMENTATION

CROSS-REFERENCE TO RELATED APPLICATION

This application is a divisional application of U.S. patent application Ser. No. 15/279,072, filed Sep. 28, 2016, the entire contents of which are incorporated herein by reference.

FIELD OF THE DISCLOSURE

This disclosure relates to augmenting the data capacity of pre-existing communication channels in a way so as to minimally affect legacy users of the communications channel. More specifically, this disclosure relates to system and methods for increasing the data capacity of a communications channel that employs binary offset carrier (BOC) modulation by dithering a subcarrier signal during a pre-defined time period in order to convey additional data over the channel.

BACKGROUND OF THE DISCLOSURE

As modern electronics become smaller and are able to produce data at quicker rates, often times the transmission of data becomes constrained by the bandwidth of the communications channel rather than the transmission rates of a device. Therefore, while advances in transmission speeds have the potential to speed up end-to-end communications between devices, often that potential is not realized due to the bandwidth constraints of the communications channel between the devices over which the data is transmitted.

In an attempt to maximize the amount of data that can be sent over a given communications channel at a given time, various methods of modulating and demodulating data have been used to increase the throughput of a channel. For instance various modulation techniques such as binary phase shift keying (BPSK), amplitude shift keying (ASK), or code shift keying (CSK) have been utilized to make efficient use of the bandwidth constraints presented by a given channel.

However, once a communications system is established, it can be a challenge to increase the throughput of a given channel without affecting legacy users of an existing communication channel. For instance, if a new modulation technique is employed by a transmitter of a given communication systems, legacy users of the system may not have the required demodulation hardware needed to work with the new modulation technique and thus these legacy users would not be able to participate in the new system without having to replace their existing hardware.

SUMMARY OF THE DISCLOSURE

Accordingly, a system and method for augmenting the throughput of a communications system while minimizing the impact to legacy users of the communication system is provided. The system and method can include generating shift patterns in the data to be modulated so as to encode additional data onto the modulated data stream. At the receiver, the modulated data can pass through a plurality of matched filters to not only determine the contents of the original data but also determine the content of the additional data. The system can be configured so that legacy users of the system can still receive the original data without having to replace or modify their existing receiver architectures.

BRIEF DESCRIPTIONS OF THE DRAWINGS

DETAILED DESCRIPTION

Described herein are systems and methods for augmenting the data capacity of a pre-existing communications channel that minimizes the impacts to legacy users of the communications channel. The systems and methods described herein can be used to allow certain users of a communications channel to receive a larger amount of data while at the same time allowing legacy users of the communications channel to continue receiving a normal amount of data without requiring them to modify their modulation and demodulation systems.

The system and methods can employ an alternate data source that is used to apply a dither to a carrier waveform. The original data source can be modulated using the dithered carrier waveform. On the receiver side the received transmission can be demodulated by passing the received signal through a plurality of matched filters, wherein each matched filter represents a different dither pattern along with the original data source. The resulting outputs of the matched filter can be compared to determine which dither pattern was most likely received. In this way, legacy users can still receive the original data source while new users can receive data from both the original data source and the alternate data source.

The discussion below utilizes the example of global positioning system (GPS) systems and specifically to communication channels that utilize binary offset carrier (BOC) modulation to explain the various systems and methods discussed above. However, the disclosure should not be seen as limiting and could be applicable to other types of communication systems.

Current GPS communication channels utilize low data rate signals to allow for the robust signal tracking in challenging environments in which the received signal power can be low. The use of a low data rate however can constrain the ability to add various signal integrity checks to a GPS signal such as self-contained authentication capability. For instance, the fact that the GPS signal data rate is low can make inclusion of a digital signature of the data difficult to achieve, because the additional data can cause the transmitted GPS signal to exceed the data capacity of the legacy GPS system. If the GPS system were to increase the data rate of the signal so as to incorporate a digital signature, legacy users of the GPS system may be required to modify their existing communications hardware so as to ensure that they can continue to receive GPS signals. Given that GPS systems have been employed by numerous types of devices, requiring such legacy users to modify their equipment could be costly and impractical.

Figure 1:
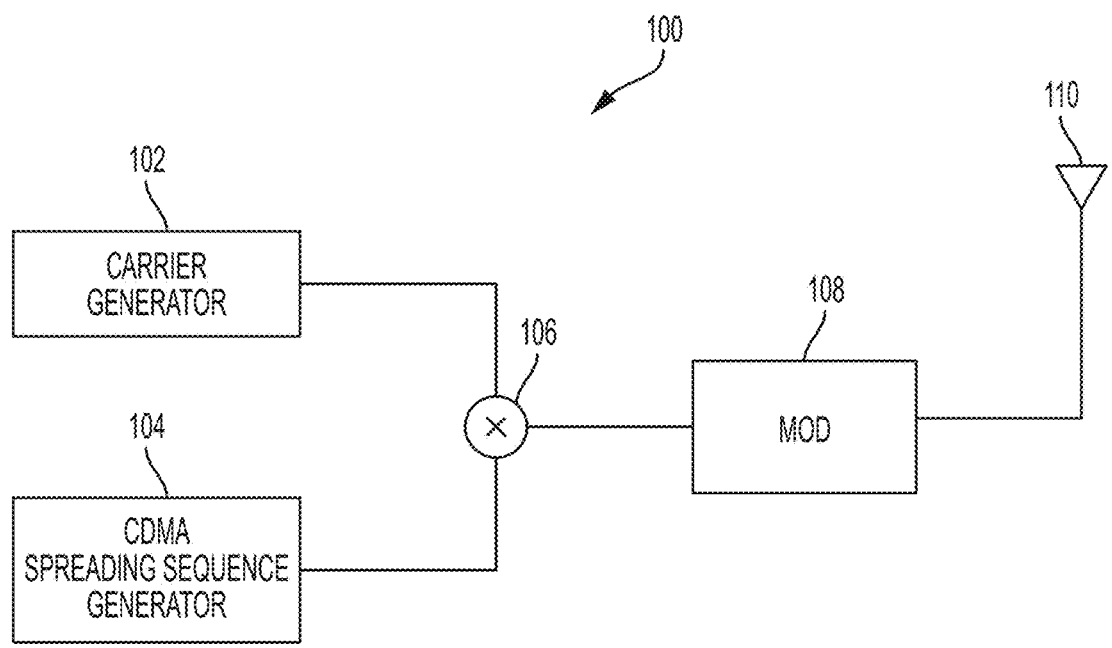
FIG. 1 illustrates an exemplary binary offset carrier modulator according to examples of the disclosure.

Legacy GPS systems can employ binary offset carrier modulation to convey data from a GPS satellite to an end user device. FIG. 1 illustrates an exemplary binary offset carrier modulator according to examples of the disclosure. The system 100 can employ a conventional GPS transmitter that utilizes BOC modulation. In the example of FIG. 1, the system 100 can include a code division multiple access (CDMA) symbol generator 104 that can generate the CDMA spreading sequence used by GPS devices to determine the position of a GPS enabled device via trilateration. The CDMA symbol generator 104 can mix a pseudo-random noise (PRN) sequence with a subcarrier waveform (discussed below with respect to FIG. 3) to produce its output. The output of the CDMA generator 104 can be mixed at mixer 106 with a carrier signal generated by carrier signal generator 102 that can shift the signal generated CDMA generator 104 into a radio frequency (RF) band. In some examples, the signal outputted at mixer 106 can be further modulated by modulator 108 and then transmitted by antenna 110. In one example, modulator 108 can be a binary phase shift keying (BPSK) modulator. In other examples, the output of mixer 106 can be directly transmitted by antenna 110.

Figure 2:
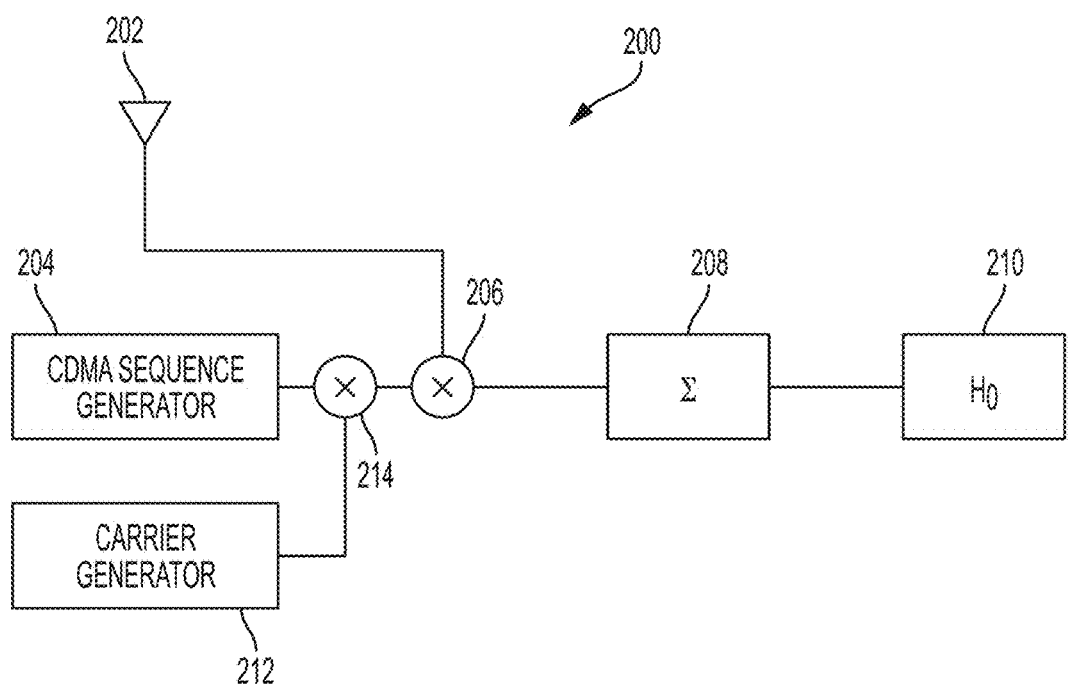
FIG. 2 illustrates an exemplary binary offset carrier receiver according to examples of the disclosure.

FIG. 2 illustrates an exemplary binary offset carrier receiver according to examples of the disclosure. The receiver 200 illustrated in FIG. 2 can be configured to receive GPS signals transmitted from transmitters like the one discussed above with respect to FIG. 1. The receiver 200 can include a CDMA sequence generator 204. The CDMA sequence generator can be programmed to be synchronized with a CDMA sequence generator 104 of the transmitter 100 discussed with respect to FIG. 1. Being synchronized can mean that both the CDMA sequence generator 104 of the transmitter and the CDMA sequence generator 204 of the receiver can generate the same CDMA chip sequence mixed with a subcarrier waveform of identical frequencies.

The output of the CDMA sequence generator 204 can be mixed at mixer 214 with a carrier generator 212 that operates in substantially the same manner as carrier generator 102 of the transmitter discussed with respect to FIG. 1. In one example, the carrier generator 214 can be tuned to have a frequency equal to that of the frequency set at carrier generator 102 so as to shift the signal from the RF back to a passband or baseband.

At mixer 206, the signal generated by the CDMA sequence generator 204 mixed with the carrier waveform generated by carrier generator 212 can further be mixed with the signal received by antenna 202. Since the CDMA sequence generator 204 generates an identical code as the CDMA sequence generator 104 of the transmitter 100, the mixing occurring at mixer 206 can act as a matched filter for the signal received at antenna 202 (with the CDMA code generated by the generator 204 being shifted to account for propagation delay). The mixed signal at the output of mixer 206 can be accumulated at accumulator 208 and can be processed by processor 210 for further processing.

The system described with respect to FIGS. 1 and 2 can illustrate the constraints of transmitting additional data through the communications channel. Any additional data sent across the channel could require additional processing at the receiver. With respect to legacy receivers, implementing the additional processing required to receive an additional data source may not feasible as many legacy systems are not accessible to be modified (i.e., the legacy receiver is on a mobile device in use). A change for instance to the data rate of the transmitter 100 via the CDMA sequence generator 104 could require that the CDMA generator 204 of the receiver 200 be altered identically so that the matched filter of the receiver maintains signal fidelity. In other words, a change to the GPS transmitter could require a change in hardware or software for legacy receiver systems or even require that legacy user update their systems or risk being unable to enable GPS functionality on their devices. In another example, a change to the modulator 108 rate, could entail a software change in processor 210, accumulator 208, or both.

Ideally if an increased data rate is desired, for example to enable digital signing of the GPS signal data, the transmitted signal from the GPS transmitter would need to be altered so that legacy users can still employ the system even if they do not upgrade their software or hardware. Thus, the GPS transmitter signal should be altered so as to minimize the increase in error rate that would be associated with a GPS receiver receiving a signal that is not matched to the signal transmitted. In this way, legacy users of the system can still employ GPS capability on their devices, while users who wish to utilize the higher data rate signal can employ a GPS receiver that is capable of receiving the "new" signal.

Figure 3:
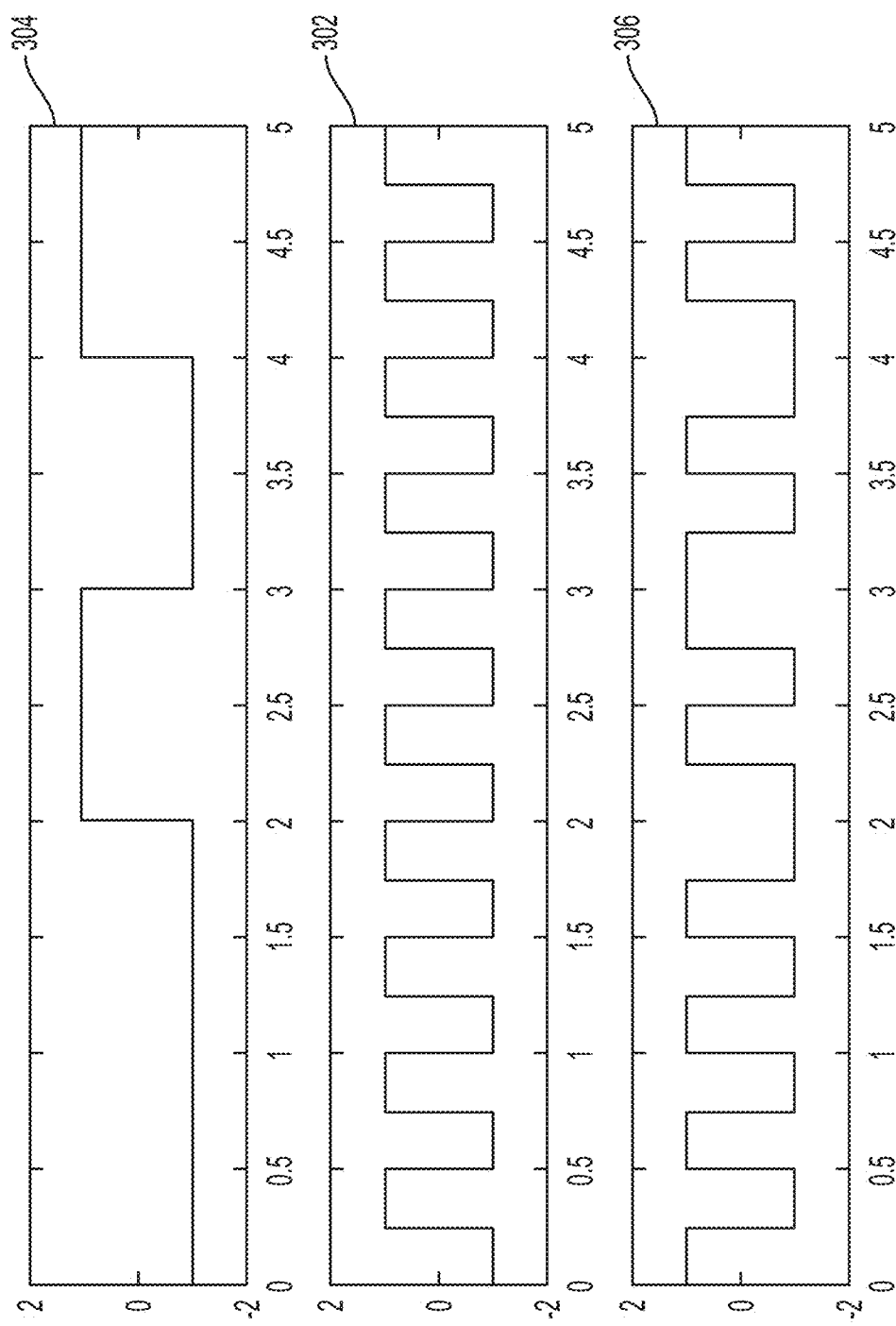
FIG. 3 illustrates exemplary signals generated by a transmitter according to examples of the disclosure.

In order to illustrate methods by which a transmitter can be altered to increase the data rate outputted, the signals generated within the transmitter can be examined to determine ways in which the data rate can be augmented. FIG. 3 illustrates exemplary signals generated by a transmitter according to examples of the disclosure. In the example of FIG. 3, signal 304 can represent the output of the CDMA sequence generator 104 of FIG. 1, signal 302 can represent the subcarrier signal produced internally by the CDMA sequence generator 104, that is mixed with the PRN code as discussed with respect to FIG. 1, and signal 306 can represent the output of mixer 106 of FIG. 1 when the signals generated by CDMA sequence generator 104 and carrier signal generator 102 are mixed. The X-axis of each graph can represent the chip number. For instance values between 0 and 1 on the x-axis of each graph can represent the state of the signal when the first chip is generated by the CDMA sequence generator 104. The Y-axis of each graph can represent the voltage of the signal. For instance for signal 304, the voltage can vary between −1 and 1V.

In order to transmit additional data, rather than modifying the data bit rate of the communications system discussed with respect to FIGS. 2 and 3, modifying the signal being generated by the CDMA generator 104, and more specifically the subcarrier waveform employed by the CDMA generator 104 (e.g., signal 302 of FIG. 3) can be altered to increase the data rate of a communications system with minimal impact to legacy users. In other words, while conventional communications systems modify the data bit rate (i.e., signal 304) to the detriment of legacy users, using the subcarrier waveform to encode additional data into the transmission stream of a transmitter can yield increased data capacity in the communications systems while at the same time minimizing the impact on legacy users of the system. By minimizing the impact to legacy users, the additional encoding of data on the carrier waveform may not require a legacy user to upgrade their hardware.

Figure 4:
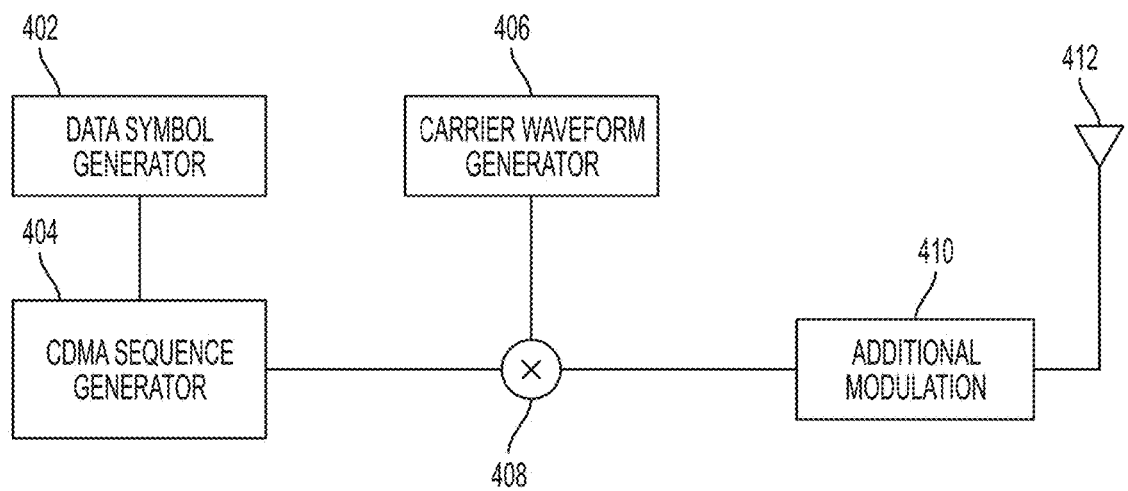
FIG. 4 illustrates an exemplary binary offset carrier transmitter with carrier waveform dithering according to examples of the disclosure

FIG. 4 illustrates an exemplary binary offset carrier transmitter with carrier waveform dithering according to examples of the disclosure. The exemplary system of FIG. 4 can employ dithering of the subcarrier waveform in order to encode an additional data source into the transmitted data stream thereby increasing the data rate of the binary offset carrier transmitter while minimizing the impact to legacy users. The example of FIG. 4 can include both data symbol generator 402 and CDMA sequence generator 404. CDMA sequence generator 404 can operate in substantially the same way as the CDMA generator 104 and 204 discussed with respect to FIGS. 1 and 2. Data symbol generator 402 can be used to generate symbols associated with additional data that a user of the system depicted in FIG. 4 desires to have transmitted. For instance, data symbol generator 402 can generate symbols associated with a scheme to generate digital signatures of the GPS data (assuming that the transmitter in FIG. 4 is employed by a GPS communications system).

The symbols generated by data symbol generator 402 can be passed to CDMA sequence generator 404. The output of data symbol generator 402 can be used by CDMA sequence generator 404 to "dither" the subcarrier waveform based on the symbols generated by data symbol generator 402. "Dithering" can refer to shifting in time of the periodic carrier waveform over one or more periods. The direction of the shift in time can be based on the value of the symbol generated by the data symbol generator 402. The dithered signal can be further mixed with a carrier waveform 406 at mixer 408 to shift the signal from the baseband/passband to the RF frequency band. Additional modulation such as BPSK can be applied by modulator 410, and the signal can then be transmitted by antenna 412 in substantially the same manner as described with respect to FIG. 1.

Figure 5:
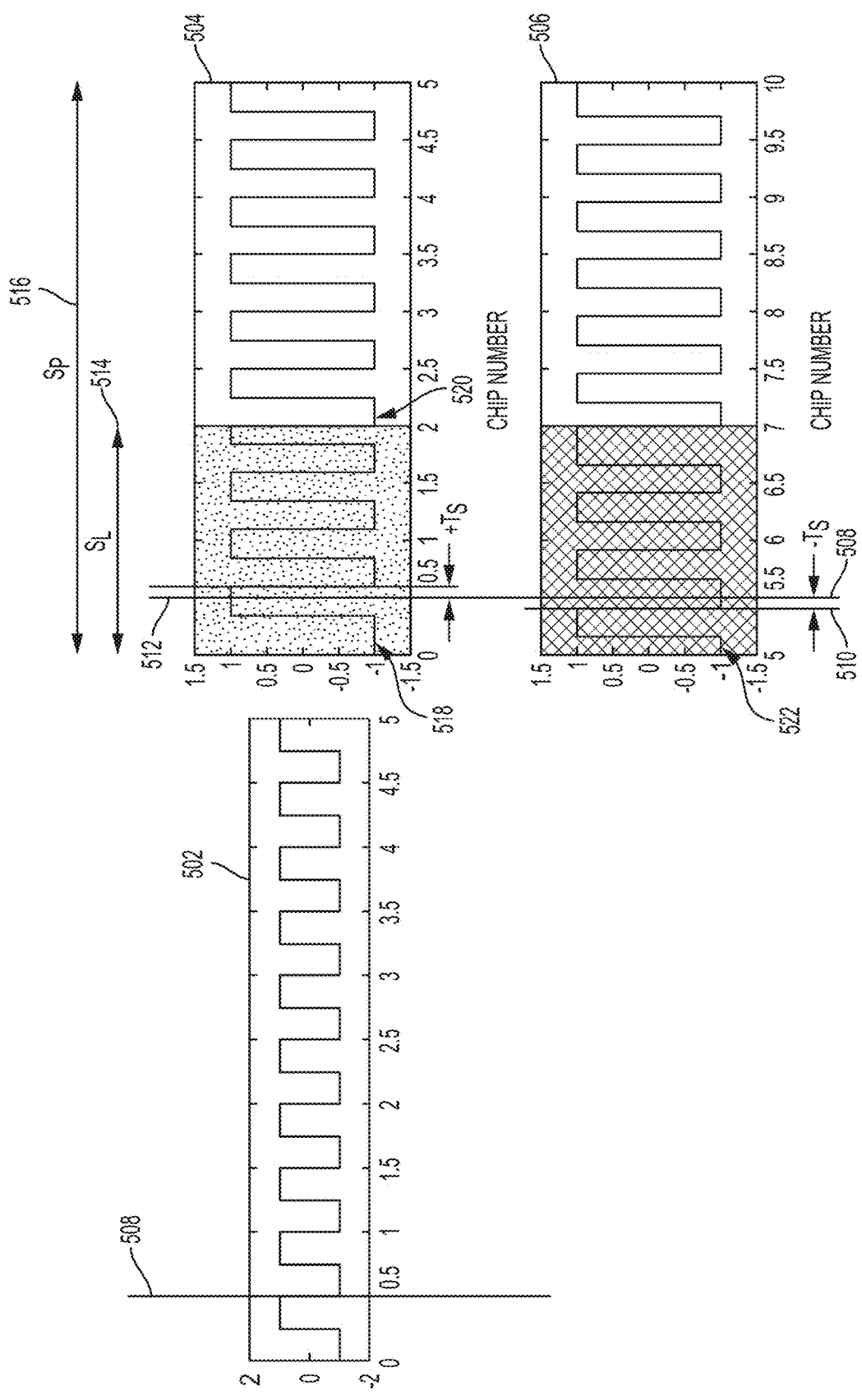
FIG. 5 illustrates an exemplary carrier waveform dithering scheme according to examples of the disclosure.

FIG. 5 illustrates an exemplary carrier waveform dithering scheme according to examples of the disclosure. The dithering scheme of FIG. 5 illustrates three separate waveforms. The first waveform 502 illustrates an undithered subcarrier waveform. The second waveform 504 illustrates a subcarrier waveform that is dithered in response to receiving a "one" symbol from the carrier waveform generator 506. The third waveform 506 illustrates a subcarrier waveform that is dithered in response to receiving a "0" symbol from the data symbol generator 402.

In the example of FIG. 5, and as discussed above, subcarrier waveform 502 can represent an undithered subcarrier waveform. For the purpose of illustration, and without unduly narrowing the scope of the disclosure, the undithered waveform 502 can have a period equal to approximately one half of a chip period. As illustrated, the subcarrier waveform can have a first rising edge at approximately 0.25 of the chip symbol period and a first falling edge at approximately 0.5 of the chip symbol period. This pattern can repeat itself in a periodic manner during the duration of a CDMA sequence transmission.

Subcarrier waveform 504 can represent a dither pattern applied to a subcarrier waveform when a "one" is generated by data symbol generator 402. In order to understand the dither pattern, some parameters are defined and referenced in the disclosure so as to explain how the dither pattern is applied. $S_L$ can be defined as shift length 514. Shift length 514 can be defined as the period of time in which a particular shift pattern is applied to the subcarrier waveform. In the example of FIG. 5, the shift pattern $S_L$ 514 can be approximately four times the subcarrier (i.e., undithered subcarrier waveform) period. $S_P$ 516 can be defined as the total shift period. The total shift period can represent one period of a dithered waveform.

In the example waveform of 504, when a one is generated by the data symbol generator 402, the subcarrier waveform can be shifted (i.e., dithered) by shifting the subcarrier waveform in time to the "right" which can mean delaying the first rising edge by a definite amount of time. In the figure as illustrated, the first rising edge 518 can be delayed by approximately 0.2 of a subcarrier period. After applying the shift, the subcarrier waveform can progress normally, rising and falling in a periodic manner with the same timing as an undithered waveform (other than the initial shift of the waveform as discussed above). This shifted waveform can be allowed to progress until the end of the shift length 514.

At end of the shift length period 514, the dithered subcarrier waveform, rather than experiencing a falling edge in the undithered example of 502, can still be in mid-waveform. In the example of 504, the waveform at the end of the shift length can be abruptly terminated at 520 (i.e., have a falling edge occur at the end of the shift length). From the end of the shift length 514 and for the rest of the shift period 516, the subcarrier waveform can be returned to its undithered timing sequence similar to that illustrated in waveform 502.

In the event of a zero being generated by data symbol generator 402, the dither pattern illustrated by waveform 506 can be applied. In the example of waveform 506, rather than being shifted to the right, the waveform can be shifted to the "left" or in other words the first rising edge of the subcarrier waveform can be encountered earlier in comparison to the undithered example of waveform 502. In the example of undithered waveform 502, the first rising edge can be encountered at 0.25 of a chip period. In the example of waveform 506, the first rising edge 522 can be encountered earlier (approximately 0.05 of the chip period) thereby shifting the waveform to the left in time. Therefore, whereas in an unshifted example the first falling edge would have occurred at time 508, as the waveform is shifted to the left, it can occur at time 510.

In substantially the same manner as discussed above with respect to waveform 504, after the initial shift, the rest of the waveform can be allowed to progress with the same frequency and period as the undithered waveform until the end of the shift length 514. At the end of the shift length 514, the last waveform can be prolonged so that the falling edge can coincide with the end of the shift length. In the same way as subcarrier waveform 504, the rest of the subcarrier waveform can proceed unshifted between the end of the shift length 514 and the rest of the shift period 516.

By applying waveform 504 for a one generated by data symbol generator 402, and applying waveform 506 for a zero generated by data symbol generator 402, the data generated can be encoded into the transmission without altering the chip rate and without substantially altering the bandwidth of the data transmitted over the communications channel. In other words, the data capacity of the channel can be increased with minimal changes to the bandwidth of the signal transmitted.

Figure 6:
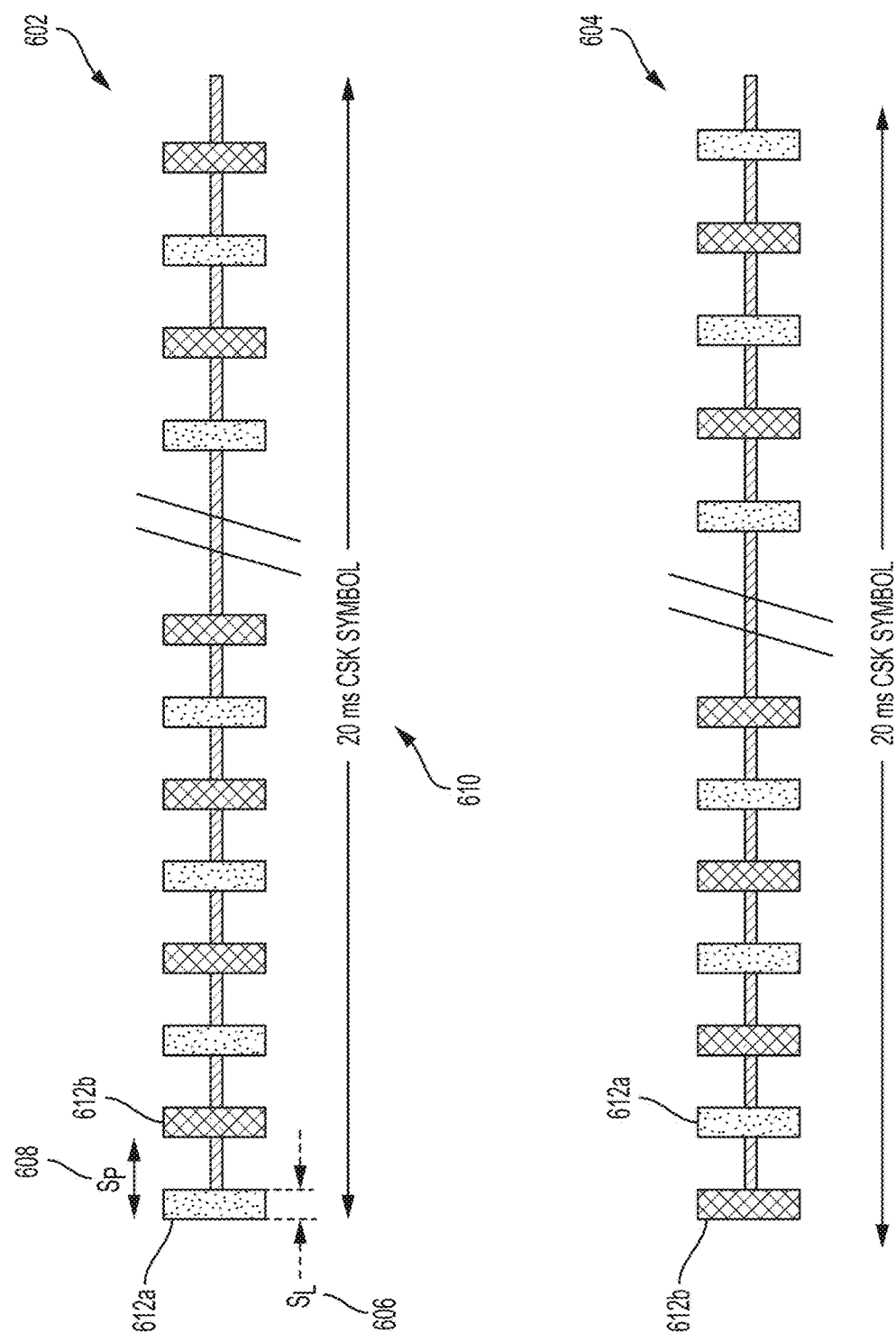
FIG. 6 illustrates an exemplary zero average shift dithering scheme according to examples of the disclosure.

To further minimize the bandwidth and spectral changes associated with dithering, the average shift of the entire transmission can be kept at substantially zero using the scheme illustrated in FIG. 6. FIG. 6 illustrates an exemplary zero average shift dithering scheme according to examples of the disclosure. In the example of FIG. 6, the dithering scheme can be expressed by waveforms 602 and 604. Waveform 602 illustrates an exemplary dithering scheme associated with a "one" symbol being produced by the data symbol generator 402 and can represent a zoomed out in time version of waveform 504 of FIG. 5.

Waveform 602, during the total shift period 608 $S_p$ (discussed above), can be dithered in accordance with the example discussed above with respect to waveform 504. Thus, during the first shift length 606, the waveform can be shifted to the right at 612a and then undithered in the time period between the end of the shift length 606 and the end of the total shift period 608. At the end of the first total shift period 608, the waveform 602 can be shifted to the left at 612b during a second shift length, and then left undithered between the end of the second shift length and the end of the second total shift period. This alternating pattern between shifting to the right and left can be alternated as shown in the figure over a total symbol time 610. In the example of waveform 602 the total symbol time 610 can be 20 mS. In other words, data symbol generator 402 can produce one symbol every 20 mS. Thus when data symbol generator 402 produces a "one" symbol, the subcarrier waveform can be dithered in accordance with the scheme of waveform 602 in which the subcarrier waveform is first shifted to the right, and then shifted to left, and so on for the duration that the data symbol generator 402 produces a one bit.

In the event of a "zero" bit being produced by the data symbol generator 402, the subcarrier waveform can be dithered using the scheme depicted by waveform 604. The example of waveform 604 can be identical to that of waveform 602, except that the pattern begins with waveform 612b and alternates back and forth between 612b and 612a as shown whereas the example of waveform 602 begins with 612a.

In this way, whether a one or zero is generated by the data symbol generator 402, the average time shift of the subcarrier waveform can remain at zero since the waveform is dithered to the right and to the left equally for every symbol generated by the data symbol generator. The zero mean time shift can ensure that systems sensitive to the shift patterns induced by the encoding are minimally affected by the dithering scheme.

Figure 7:
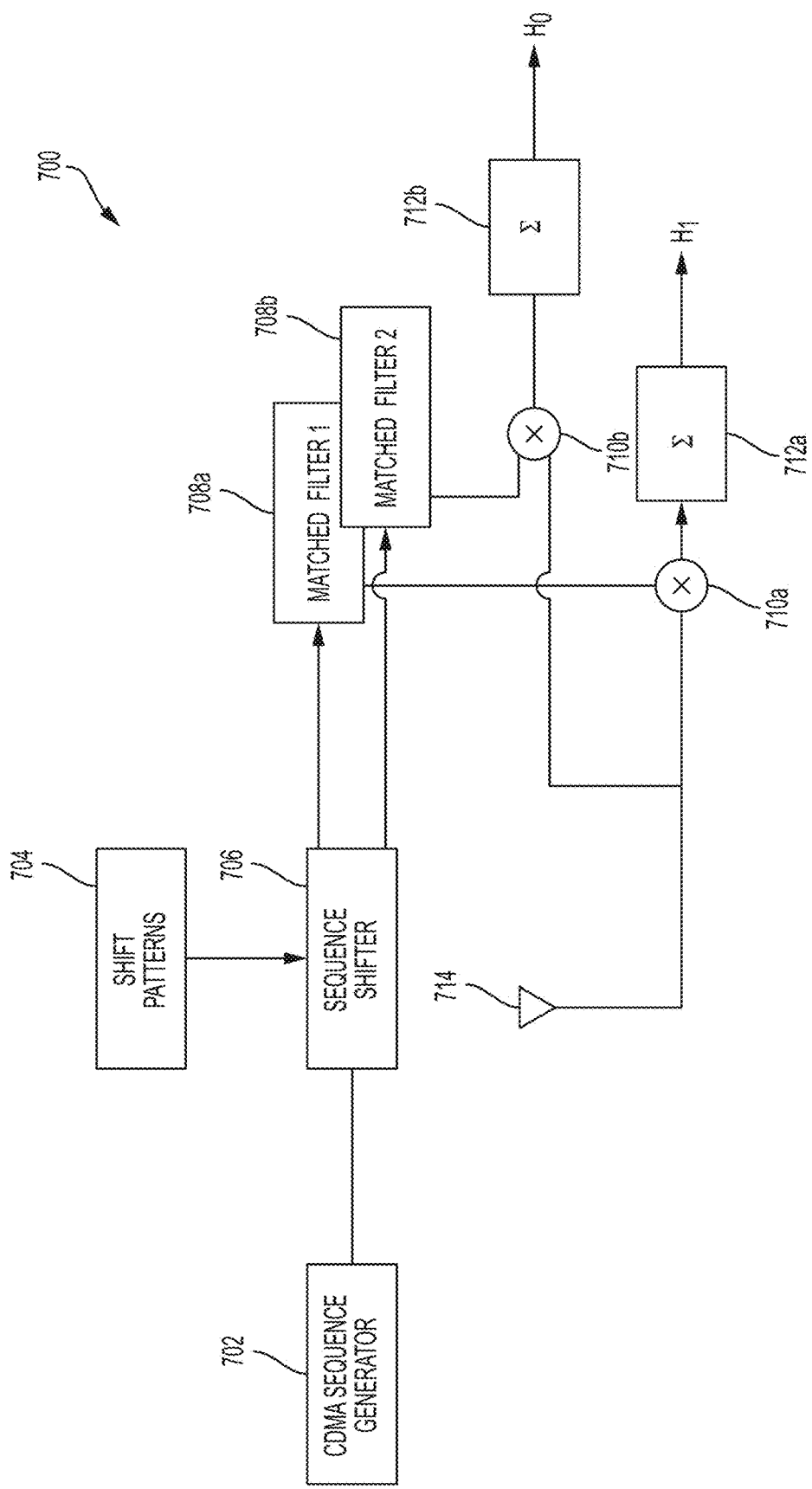
FIG. 7 illustrates an exemplary binary offset carrier receiver configured to receive data that is encoded by carrier waveform dithering according to examples of the disclosure.

FIG. 7 illustrates an exemplary binary offset carrier receiver configured to receive data that is encoded by subcarrier waveform dithering according to examples of the disclosure. Similar to the receiver discussed with respect to FIG. 2, the receiver 700 can utilize matched filtering to decode transmissions sent by a transmitter equipped with subcarrier waveform dithering such as the one discussed with respect to FIG. 4.

The receiver 700 can be configured to receive signals transmitted by the transmitter described with respect to FIG. 4. The receiver 700 can include a CDMA sequence generator 702 that is substantially identical to the CDMA sequence generator 204 of FIG. 2. The CDMA sequence generator 702 can be synchronized with CDMA sequence generator 402 of FIG. 4. For each CDMA sequence generated by CDMA sequence generator 702, shift pattern generator 704 can generate a subcarrier waveform that assumes a dither pattern associated with waveform 602 of FIG. 6 associated with a "one" symbol generated by subcarrier waveform generator 406 as discussed above, and can generate a subcarrier waveform that assumes a dither pattern associated with waveform 604 of FIG. 6 associated with a "zero" symbol generated by carrier waveform generator 406 as discussed above.

The shift patterns generated by shift pattern generator 704 can be mixed with the output of CDMA sequence generator 702 at sequence shifter 706 to generate two distinct matched filters 708a and 708b. Matched filter 708a can be associated with the CDMA sequence when a "one" symbol is encoded via dither, and matched filter 708b can be associated with the CDMA sequence when a "zero" symbol is encoded via dither as discussed above.

When a signal is received by antenna 714 it can be mixed with each individual matched filter 708a and 708b at 710a and 710b respectively. The outputs of mixers 710a and 710b can be accumulated at 712a and 712b respectively and compared to determine which dither pattern was most likely received. Thus for example, if the data subcarrier waveform 406 was dithered using the dithering scheme associated with a "one" symbol than output of 712a would be greater than the output of 712b and thus the receiver 700 can determine that a "one" symbol was transmitted. If the data subcarrier waveform 406 was dithered using the dithering scheme associated with a "zero symbol" than output of 712b would be greater than the output of 712a and thus the receiver 700 can determine that a "zero" symbol was transmitted.

Thus, by having a priori knowledge of the CDMA sequence, and the potential dither patterns associated with the various symbols produced by the subcarrier waveform generator at the transmitter, the receiver 700 can decode data encoded into the subcarrier waveform via dithering.

The dithering schemes described above can have minimal impact to legacy users of the communications system. For instance if the receiver described with respect to FIG. 2 (i.e., a legacy receiver) were to be employed to receive a transmission generated by the transmitter described with respect to FIG. 4, the signal degradation caused by the dithering can be minimal.

To illustrate the impact, and ignoring noise and carrier mixing for the moment, and given a received signal amplitude A, sampling frequency $F_S$, and the various previously defined parameters (discussed above), the expected accumulation value over the shift period $S_P$ can be given by:

$$= \frac{F_s A}{2}\left(T_s + S_p - S_L + \int_{T_S}^{S_L} C(t)C(t - T_s)dt\right)$$

Where C(t) is the subchip sequence (i.e., a square wave). The autocorrelation function for a square wave with a circular shift τ can be expressed as:

$$R(\tau) = C(t)C(t - \tau) = 1 - \frac{4}{t_s}\tau, 0 \le \tau < 0.5 t_s$$

Thus the accumulation value (over $S_P$ subcarrier periods) can be given by $$I_{accum} = \frac{F_s A}{2}\left(T_s + S_L - S_L + [S_L - T_s]\left[1 - \frac{4}{t_s}T_s\right]\right) = \frac{F_s A}{2}\left(S_P - \frac{4T_s}{t_s}(S_L - T_S)\right)$$

The correlation loss $L_C$ for a signal can be computed as the ratio of the expected accumulation value using $T_S=0$ to the expected accumulation value using the actual $T_S$.

$$L_C = 10 * \log_{10}\left(\frac{F_s A}{2}\left[S_P - 4\frac{T_s}{t_s}(S_L - T_S)\right]\right) - 10 * \log_{10}\left(\frac{F_s A}{2}[S_P]\right) =$$

-continued $$10*\log_{10}\left(1-\frac{4T_s}{t_sS_P}(S_L-T_S)\right)$$

Thus, for a BOC(1,1) signal ($t_s$=1/1.023e6) with $S_L$=5$t_s$, $S_P$=100 $t_s$ and $T_S$=0.1 $t_s$, correlation loss can be computed as 0.0897 dB. In other words, the computed correlation loss for a legacy receiver receiving a signal that has been dithered using the scheme described with respect to FIGS. 4-7 can be less than 0.1 dB.

As the above calculations illustrate, while the dithering scheme can allow for additional data to be transmitted with minimal spectral impacts on the channel, legacy receivers may only see minimal performance degradation thus allowing for legacy users to still participate in communications systems that employ transmitters modified to encode additional data.

Figure 8:
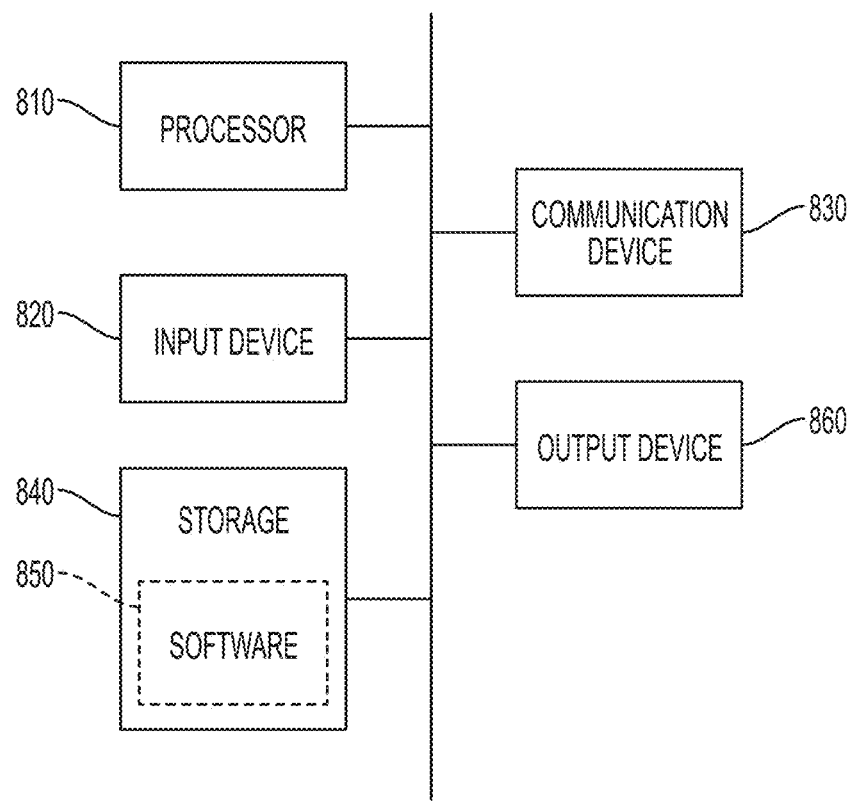
FIG. 8 illustrates an example of a computing device in accordance with one embodiment of the disclosure.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, work station, server, or handheld computing device (portable electronic device) such as a phone or tablet. The device can include, for example, one or more of processor 810, input device 820, output device 830, storage 840, and communication device 860. Input device 820 and output device 830 can generally correspond to those described above, and can either be connectable or integrated with the computer.

Input device 820 can be any suitable device that provides input, such as a touchscreen, keyboard or keypad, mouse, or voice-recognition device. Output device 830 can be any suitable device that provides output, such as a touchscreen, haptics device, or speaker.

Storage 840 can be any suitable device that provides storage, such as an electrical, magnetic, or optical memory including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus, or wirelessly.

Software 850, which can be stored in storage 840 and executed by processor 810, can include, for example, the programming that embodies the functionality of the present disclosure (e.g., as embodied in the devices described above).

Software 850 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction-execution system, apparatus, or device.

Software 850 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has made reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments, with various modifications, that are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for receiving an augmented data rate global navigation satellite system transmission, the method comprising:
    generating an expected data sequence;
    generating a subcarrier waveform;
    applying a first dithering scheme to a first portion the generated subcarrier waveform based on a first data, wherein the first portion includes a plurality of sub-portions, and wherein the first dithering scheme includes shifting a first sub-portion of the first portion of the generated subcarrier waveform in time in a first direction;
    applying a second dithering scheme to the first portion of the generated subcarrier waveform, wherein the second dithering scheme includes shifting the first sub-portion of the first portion of the generated waveform in time in a second direction;
    generating a first matched filter based on the expected data sequence and the first subcarrier waveform dithering pattern;
    generating a second matched filter based on the expected data sequence and the second subcarrier waveform dither pattern;
    receiving a transmitted signal;

applying the first matched filter to the received transmitted signal to generate a first demodulated signal;

applying the second matched filter to the received transmitted signal to generate a second demodulated signal; and comparing the first demodulated signal and the second demodulated signal to determine whether the received transmitted signal included the first dithering pattern or the second dithering pattern.

2. The method of claim 1, wherein the first dithering scheme includes shifting the first sub-portion of the first portion of the generated subcarrier waveform in the first direction and shifting a second sub-portion of the first portion of the generated subcarrier waveform in the second direction.

3. The method of claim 2, wherein a number of the sub-portions of the plurality of sub-portions of the first portion that are shifted in the first direction is equal to a number of the sub-portions of the plurality of sub-portions of the first portion that are shifted in the second direction.

4. The method of claim 1, wherein the second dithering scheme includes shifting the first sub-portion of the second portion of the generated subcarrier waveform in the second direction and shifting a second sub-portion of the second portion of the generated subcarrier waveform in the first direction.

5. The method of claim 4, wherein a number of the sub-portions of the plurality of sub-portions of the second portion that are shifted in the second direction is equal to a number of the sub-portions of the plurality of sub-portions of the second portion that are shifted in the first direction.

6. The method of claim 1, wherein the global navigation satellite system transmits and receives binary offset subcarrier signals.

7. A non-transitory computer readable storage medium having stored thereon a set of instructions for receiving an augmented data rate global navigation satellite system transmission that when executed by a computing device, cause the computing device to:

generate an expected data sequence;

generate a subcarrier waveform;

apply a first dithering scheme to a first portion the generated subcarrier waveform based on a first data, wherein the first portion includes a plurality of sub-portions, and wherein the first dithering scheme includes shifting a first sub-portion of the first portion of the generated subcarrier waveform in time in a first direction;

apply a second dithering scheme to the first portion of the generated subcarrier waveform, wherein the second dithering scheme includes shifting the first sub-portion of the first portion of the generated waveform in time in a second direction;

generate a first matched filter based on the expected data sequence and the first subcarrier waveform dithering pattern;

generate a second matched filter based on the expected data sequence and the second subcarrier waveform dither pattern;

receive a transmitted signal;

apply the first matched filter to the received transmitted signal to generate a first demodulated signal;

apply the second matched filter to the received transmitted signal to generate a second demodulated signal; and compare the first demodulated signal and the second demodulated signal to determine whether the received transmitted signal included the first dithering pattern or the second dithering pattern.

8. The non-transitory computer readable storage medium of claim 7, wherein the first dithering scheme includes shifting the first sub-portion of the first portion of the generated subcarrier waveform in the first direction and shifting a second sub-portion of the first portion of the generated subcarrier waveform in the second direction.

9. The non-transitory computer readable storage medium of claim 8, wherein a number of the sub-portions of the plurality of sub-portions of the first portion that are shifted in the first direction is equal to a number of the sub-portions of the plurality of sub-portions of the first portion that are shifted in the second direction.

10. The non-transitory computer readable storage medium of claim 7, wherein the second dithering scheme includes shifting the first sub-portion of the second portion of the generated subcarrier waveform in the second direction and shifting a second sub-portion of the second portion of the generated subcarrier waveform in the first direction.

11. The non-transitory computer readable storage medium of claim 10, wherein a number of the sub-portions of the plurality of sub-portions of the second portion that are shifted in the second direction is equal to a number of the sub-portions of the plurality of sub-portions of the second portion that are shifted in the first direction.

12. The non-transitory computer readable storage medium of claim 7, wherein the global navigation satellite system transmits and receives binary offset subcarrier signals.

13. A computing system comprising:

one or more processors, the one or more processors configured to:

generate an expected data sequence;

generate a subcarrier waveform;

apply a first dithering scheme to a first portion the generated subcarrier waveform based on a first data, wherein the first portion includes a plurality of sub-portions, and wherein the first dithering scheme includes shifting a first sub-portion of the first portion of the generated subcarrier waveform in time in a first direction;

apply a second dithering scheme to the first portion of the generated subcarrier waveform, wherein the second dithering scheme includes shifting the first sub-portion of the first portion of the generated waveform in time in a second direction;

generate a first matched filter based on the expected data sequence and the first subcarrier waveform dithering pattern;

generate a second matched filter based on the expected data sequence and the second subcarrier waveform dither pattern;

receive a transmitted signal;

apply the first matched filter to the received transmitted signal to generate a first demodulated signal;

apply the second matched filter to the received transmitted signal to generate a second demodulated signal; and compare the first demodulated signal and the second demodulated signal to determine whether the received transmitted signal included the first dithering pattern or the second dithering pattern.

14. The computing system of claim 13, wherein the first dithering scheme includes shifting the first sub-portion of the first portion of the generated subcarrier waveform in the first direction and shifting a second sub-portion of the first portion of the generated subcarrier waveform in the second direction.

15. The computing system of claim 14, wherein a number of the sub-portions of the plurality of sub-portions of the first portion that are shifted in the first direction is equal to a number of the sub-portions of the plurality of sub-portions of the first portion that are shifted in the second direction.

16. The computing system of claim 13, wherein the second dithering scheme includes shifting the first sub-portion of the second portion of the generated subcarrier waveform in the second direction and shifting a second sub-portion of the second portion of the generated subcarrier waveform in the first direction.

17. The computing system of claim 16, wherein a number of the sub-portions of the plurality of sub-portions of the second portion that are shifted in the second direction is equal to a number of the sub-portions of the plurality of sub-portions of the second portion that are shifted in the first direction.

18. The computing system of claim 13, wherein the global navigation satellite system transmits and receives binary offset subcarrier signals.

* * * * *